United States Patent [19]

Kühlmann

[11] Patent Number: 5,081,920
[45] Date of Patent: Jan. 21, 1992

[54] APPARATUS FOR TRANSPORTING AND TRIMMING MUSHROOMS

[76] Inventor: Josef Kühlmann, Königstr. 51, D-4419 Laer, Fed. Rep. of Germany

[21] Appl. No.: 534,740

[22] Filed: Jun. 7, 1990

[30] Foreign Application Priority Data

Jul. 27, 1989 [DE] Fed. Rep. of Germany ....... 3924870

[51] Int. Cl.⁵ ...................... A23N 15/00; A23N 15/02
[52] U.S. Cl. ........................................ 99/639; 99/637; 99/642; 99/643; 198/475.1
[58] Field of Search ................ 99/549, 550, 546, 565, 99/635, 636, 637, 639, 642, 643; 198/475.1, 797, 798, 384

[56] References Cited

U.S. PATENT DOCUMENTS

| | | | |
|---|---|---|---|
| 2,243,530 | 5/1941 | Kok | 99/549 |
| 2,307,665 | 1/1943 | Carmichael | 198/475.1 |
| 2,712,334 | 7/1955 | Bridge | 99/635 |
| 2,935,176 | 5/1960 | Lorenzen | 198/384 |
| 3,080,902 | 3/1963 | Wilkerson | 99/550 X |
| 3,537,495 | 11/1970 | Pearson | 99/637 |
| 3,567,011 | 3/1971 | Pinkham | 198/475.1 |
| 3,605,984 | 9/1971 | Erekson et al. | 99/550 |
| 3,734,004 | 5/1973 | Losito | 99/637 |
| 4,168,642 | 9/1979 | Evans | 99/637 |
| 4,846,337 | 7/1989 | Kühlmann | 198/475 |
| 4,913,044 | 4/1990 | Heath | 99/565 |

FOREIGN PATENT DOCUMENTS

| | | |
|---|---|---|
| 3910239 | 1/1990 | Fed. Rep. of Germany . |
| 2164997 | 8/1973 | France ............................ 99/643 |
| 2289165 | 12/1987 | Japan ............................... 99/635 |

Primary Examiner—Timothy F. Simone
Attorney, Agent, or Firm—Peter K. Kontler

[57] ABSTRACT

Apparatus for transporting freshly harvested mushrooms from the farm to a gathering station has an endless conveyor which advances discrete receptacles for individual mushrooms or groups of mushrooms from the beds to the gathering station past a trimming device where the stems of the mushrooms are trimmed in automatic response to advancement past a knife. The receptacles on the conveyor are designed to permit the stems of mushrooms to enter upright sockets which enable smaller mushrooms to descend therein to a level below that of larger mushrooms in order to ensure that the knife can sever the stems at optimum distances from the pilei of the mushrooms. The receptacles are free to pivot relative to the conveyor or are mounted on the conveyor with a certain amount of friction. If the receptacles are not free to pivot, the apparatus employs devices serving to prevent changes of orientation of receptacles which carry mushrooms from the farm toward and past the trimming device.

19 Claims, 6 Drawing Sheets

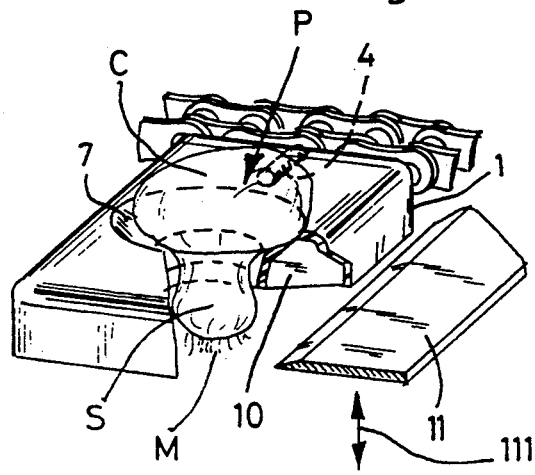
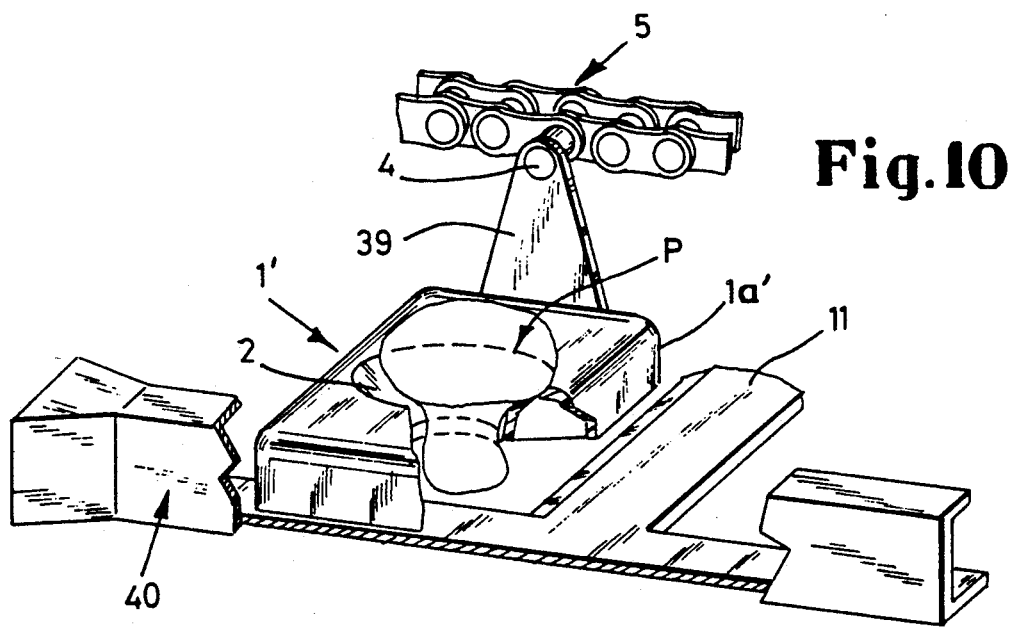

APPARATUS FOR TRANSPORTING AND TRIMMING MUSHROOMS

BACKGROUND OF THE INVENTION

The invention relates to apparatus for transporting and manipulating discrete commodities, and more particularly to improvements in apparatus which can be utilized with advantage for the transport and trimming of edible fungi, such as champignons and other mushrooms. Still more particularly, the invention relates to improvements in apparatus of the type disclosed in commonly owned German Pat. No. 39 10 230.

The German patent discloses an apparatus wherein mushrooms, which are grown in beds within a skeleton frame, are transported away by the horizontal reach of an endless chain conveyor which can be moved up and down in front of the beds in order to enable the harvesters to place freshly picked mushrooms into trough-shaped receptacles of the chain conveyor. The receptacles are pivotably mounted on the chain conveyor in pendulum fashion so that they normally tend to assume horizontal positions in which they are supposed to receive and retain harvested mushrooms during transport to an evacuating station where the contents of the receptacles are dumped into a vessel. To this end, the patented apparatus employs non-illustrated tilting means for changing the orientation of successive receptacles at the evacuating station in order to ensure the transfer of the contents of such receptacles into the vessel.

OBJECTS OF THE INVENTION

An object of the invention is to provide a novel and improved apparatus which is more versatile than the apparatus of German Pat. No. 39 10 230.

Another object of the invention is to provide an apparatus which is capable of ensuring that the receptacles on its conveyor invariably assume optimum positions for reception, transport and evacuation of conveyed commodities.

A further object of the invention is to provide an apparatus which is capable of automatically treating, particularly trimming, the commodities on their way from the harvesting station to the evacuating station.

An additional object of the invention is to provide the apparatus with a novel combination of conveyor and receptacles for fungi.

Still another object of the invention is to provide the apparatus with novel and improved receptacles for mushrooms.

A further object of the invention is to provide the apparatus with simple, compact and inexpensive receptacles which can be used in lieu of receptacles of the type described and shown in the German patent.

An additional object of the invention is to provide a novel and improved method of manipulating mushrooms during transport from the farm to the gathering station.

SUMMARY OF THE INVENTION

The invention is embodied in an apparatus for transporting and trimming fungi, particularly mushrooms, wherein a stem carries a pileus or cap at one end and a mycelum (i.e., what can be called roots) at the other end. The improved apparatus comprises a conveyor (e.g., an endless chain conveyor) defining an elongated path, a plurality of receptacles carried by the conveyor and having openings serving to receive the stems of discrete fungi while affording access to the stems in the regions of the respective mycelia, means for driving the conveyor in order to advance the receptacles along the (normally endless) path in a predetermined direction, means (e.g., a plurality of beds where the fungi grow) defining a charging station which is adjacent a first portion of the path and where the receptacles accept fungi for advancement along the path (the stems of fungi can be manually inserted into the openings of receptacles in the first portion of the path), and a trimming device adjacent a second portion of the path downstream of the first portion. The trimming device has means (such as a stationary knife) for severing the stems of fungi in the regions of the respective mycelia while the receptacles which contain fungi advance along the second portion of the path.

Each receptacle has an upper side and an underside, and each opening extends between the upper side and the underside of the respective receptacle. The openings are preferably dimensioned to permit the passage of mycelia followed by the stems but to prevent the passage of pilei so that the pilei of fungi which are accepted by receptacles at the charging station are intercepted by the upper sides of the receptacles. The severing means is adjacent the undersides of receptacles which advance along the second portion of the path. As mentioned above, the path is or can be an endless path, and the apparatus further comprises means for receiving trimmed fungi at a third portion of the path downstream of the second portion and upstream of the first portion (charging station). The endless chain of the conveyor preferably comprises means (e.g., in the form of horizontal projections) for supporting the receptacles for movement about substantially horizontal pivot axes. Each opening can be defined by a substantially funnel-shaped socket of the respective receptacle.

Each receptacle can be provided with at least one opening and each such receptacle can include a frame having the aforementioned upper side and underside, and the aforementioned socket which is at least partially surrounded by the frame. The socket has an open upper end at the general level of the upper side of the frame and an open lower end which can be located at a level below the underside of the frame. The mycelium of a fungus in a receptacle which advances beyond the first portion of the path is located beneath the lower end and the pileus of such fungus is located at the upper end of the respective socket. The knife of the severing means is located at the level of the lower ends of sockets which advance along the second portion of the path.

The frame of each receptacle can be provided with one or more reinforcing ribs or webs which are located at the underside of the frame and preferably extend to the lower end of the respective socket. If the receptacles are elongated plate-like bodies, the rib or ribs can extend substantially transversely of the longitudinal directions of the respective plate-like bodies.

Each receptacle can contain or can consist of a plastic material. For example, each receptacle can constitute a shaped (e.g., molded or extruded) plastic article.

Each receptacle can be maintained in frictional engagement with the conveyor so that it resists angular movements about the respective substantially horizontal axis. If the path includes a series of differently inclined sections (e.g., alternating horizontal and vertical sections), the apparatus preferably further comprises means for preventing changes of orientation of receptacles during advancement between successive sections of the path. The supporting means can include pivot pins or analogous projections which are provided on the conveyor, one for each receptacle, and the receptacles can have apertures which snugly receive the respective projections to prevent accidental turning of receptacles about the corresponding projections.

The means for preventing changes of orientation of the receptacles between successive (differently inclined) sections of the path can comprise a driven second conveyor (e.g., an endless chain) having means (e.g., studs or otherwise configurated protuberances) for maintaining the preferably plate-like receptacles in substantially horizontal planes (so that the axes of openings in such receptacles are substantially vertical). The protuberances of the second conveyor engage the plate-like receptacles during advancement between successive sections of the path.

Alternatively, the means for preventing changes of orientation of receptacles can comprise at least one cam which is adjacent to the receptacles advancing between successive sections of the path and is tracked by followers which are provided on the receptacles. The followers are spaced apart from the respective axes, i.e., they are not aligned with the respective projections of the conveyor for the receptacles. The followers can be omitted if the cam and the receptacles are configurated in such a way that portions of the receptacles directly engage and track the cam during advancement between successive sections of the path.

If the receptacles are free to pivot about the respective substantially horizontal axes, the means for preventing changes of orientation of receptacles during advancement between successive (differently inclined) sections of the path can include means for pivoting the receptacles relative to the conveyor. Such pivoting means can comprise a stationary rail which defines a track for portions of receptacles advancing between successive sections of the path. The rail can have a U-shaped cross-sectional outline and can define a groove for portions of successive receptacles.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 6 is a fragmentary perspective view of a mushroom-carrying receptacle at the trimming station;

FIG. 10 is a fragmentary perspective view of a modified receptacle at the trimming station and of a further device which serves to prevent changes of orientation of receptacles.

DESCRIPTION OF PREFERRED EMBODIMENTS

Figure 11:
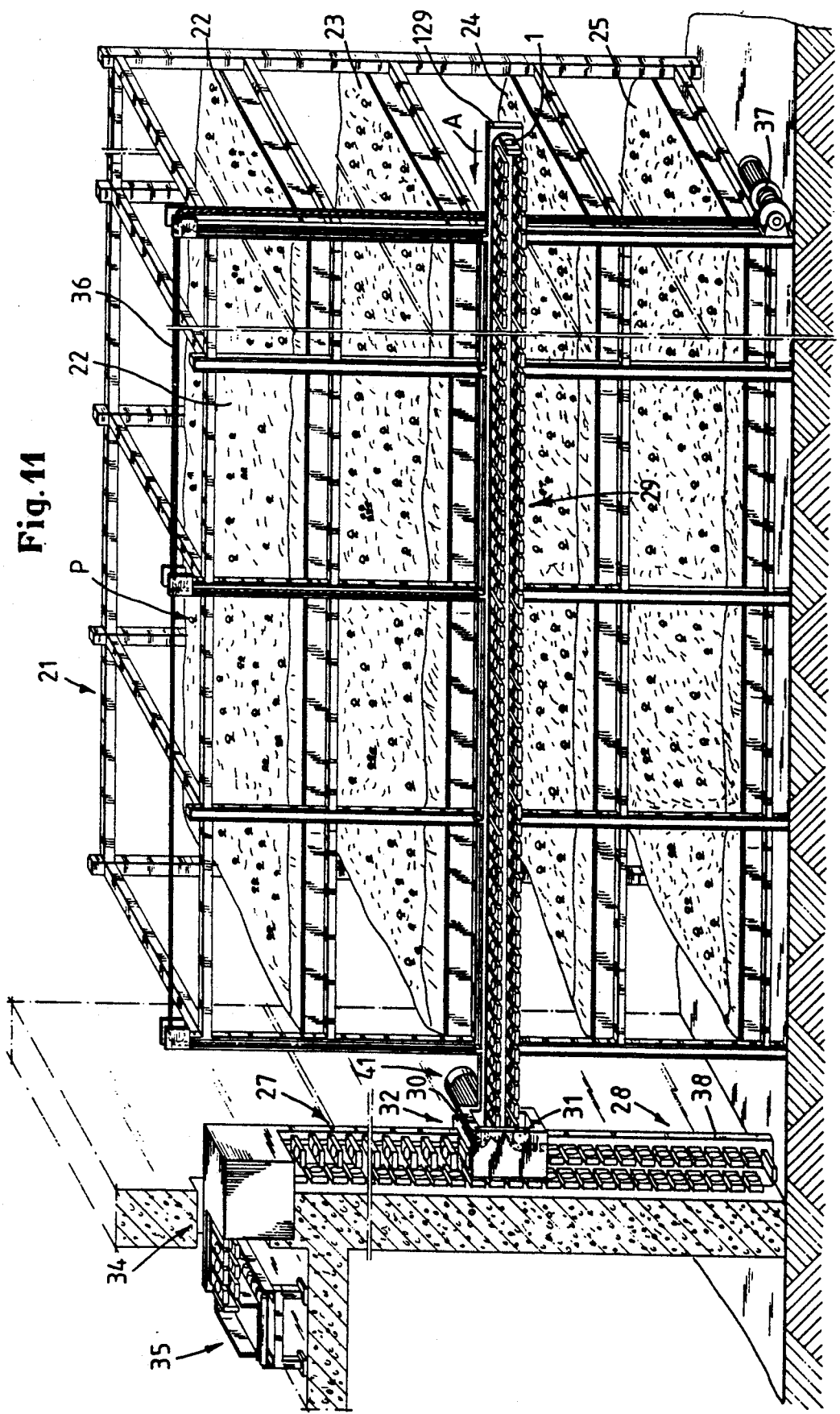
FIG. 11 is a perspective view of an entire apparatus which employs receptacles of the type shown in FIGS. 1 to 4.

Referring first to FIG. 11, there is shown an apparatus which serves to trim fungi P (hereinafter called mushrooms) in such a way that the stems S (FIG. 6) of the mushrooms are severed adjacent their free ends, i.e., at those ends which are remote from the pilei or caps C. The free ends of the stems S normally carry mycelia M. The mushrooms P are grown in beds (four beds are shown at 22, 23, 24 and 25) within a frame 21. The beds 22–25 are located at different levels, and grown mushrooms P can be harvested by hand to be transferred onto empty horizontal plate-like receptaclees 1 at a charging station 29 in front of the beds 22 to 25. The apparatus comprises a transporting unit 27 for the receptacles 1, and such transporting unit includes an endless chain conveyor 5 which defines a series of mutually inclined (generally vertical and generally horizontal) sections of an elongated endless path. The charging station 29 is adjacent a portion of a horizontal section of the endless path which is defined by the chain conveyor 5. The mushrooms P are edible fungi, e.g., champignons.

Figure 1:
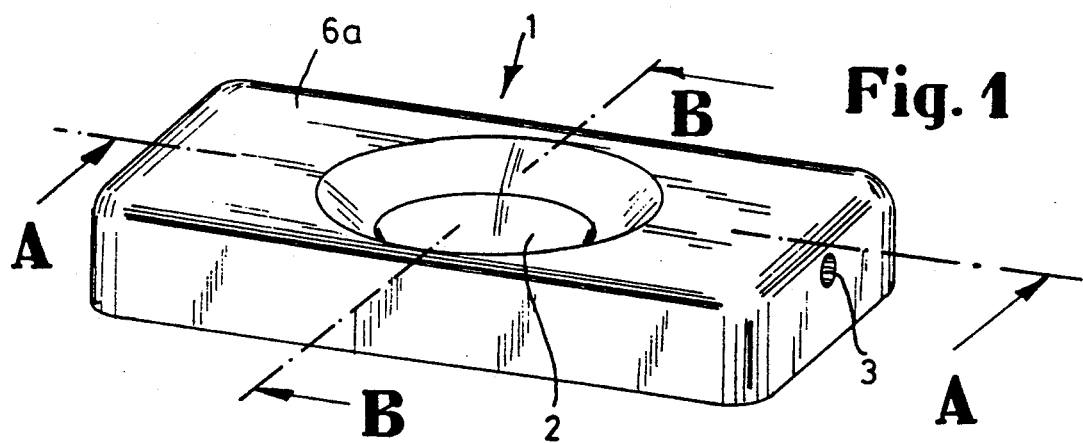
FIG. 1 is a first perspective view showing the upper side of a receptacle which can be utilized in the apparatus of the present invention.
Figure 2:
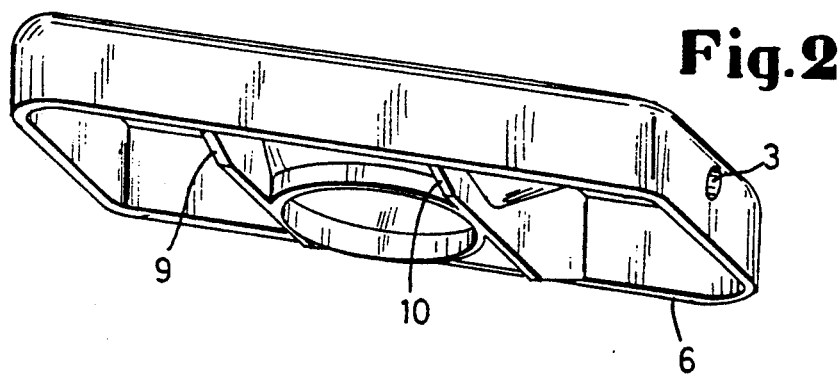
FIG. 2 is a second perspective view showing the underside of the receptacle.
Figure 3:
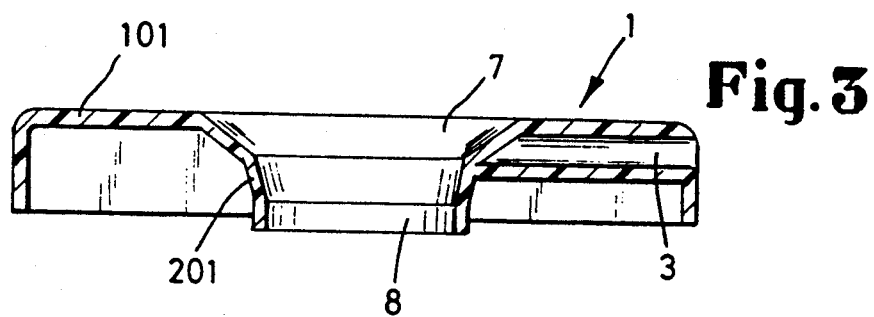
FIG. 3 is a sectional view substantially as seen in the direction of arrows from the line A—A of FIG. 1.
Figure 4:
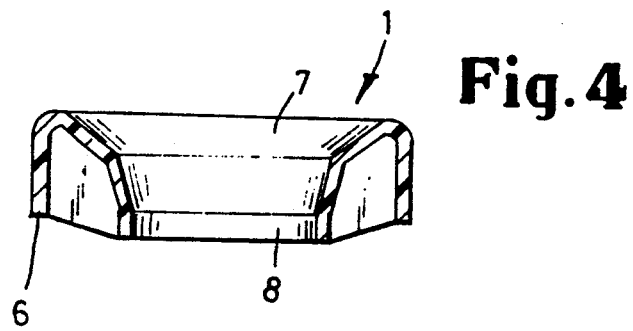
FIG. 4 is a sectional view substantially as seen in the direction of arrows from the line B—B of FIG. 1.
Figure 5:
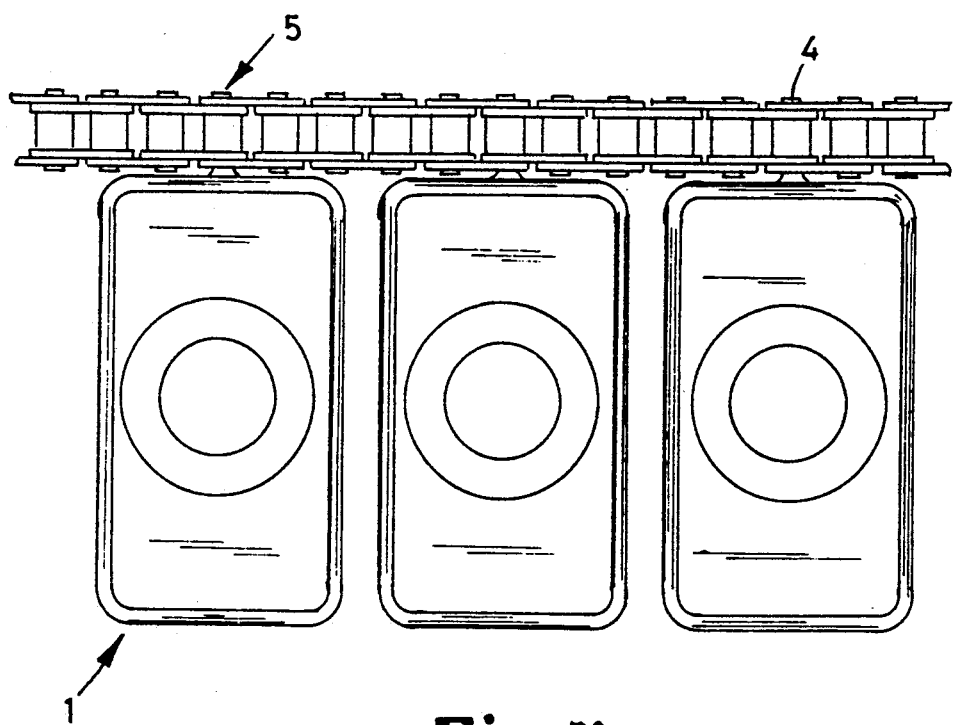
FIG. 5 is a plan view of three neighboring receptacles and of a portion of the endless chain conveyor which supports and advances the receptacles.

The means for driving the chain conveyor 5 in order to advance the receptacles 1 along the endless path includes an electric motor 41 or another suitable prime mover. The endless path includes two elongated substantially horizontal sections at the charging station 29, two shorter substantially horizontal sections including a path portion adjacent a trimming device 34 and a path portion adjacent a device 35 which serves to receive trimmed mushrooms, and two substantially vertical sections at 28. The conveyor 5 has projections 4 (FIG. 6) in the form of pins or studs which extend with friction into complementary apertures 3 (e.g., bores or holes shown in FIGS. 1 to 3) of the receptacles 1. The projections 4 define substantially horizontal pivot axes for the respective receptacles 1 but the frictional engagement between such projections and the surfaces surrounding the respective apertures 3 is preferably sufficient to prevent accidental changes of angular positions of the receptacles with reference to the chain conveyor 5. On the other hand, it is desirable to maintain the substantially plate-like receptacles 1 in or at least close to horizontal planes, at least while the receptacles transport mushrooms P from the charging station 29 toward and past the trimming device 34. Therefore, the apparatus further comprises means for preventing changes of orientation of receptacles 1 between the charging station 29 and the trimming device 34. The latter comprises a stationary knife 11 (FIG. 6) which is adjacent the undersides of successive receptacles 1 and has a cutting edge which severs the stems S of mushrooms P in successive filled or charged receptacles 1 beneath the open lower ends 8 (FIGS. 3 and 4) of funnel-shaped sockets 201 forming part of the receptacles and defining vertical openings 2 for the stems S. Means can be provided for intermittently sharpening the cutting edge of the knife 11, or the apparatus can be furnished with a supply of knives which are readily insertable into the trimming device 34.

The receiving device 35 can include a trough wherein the receptacles 1 are caused to change their orientation so as to dump trimmed mushrooms P into the trough. The bottom wall of the trough can constitute the upper reach of an endless belt conveyor which transports trimmed mushrooms to a next station, e.g., to a washing station. The device 35 is not provided with any means for preventing changes of orientation of receptacles 1; therefore, all that is necessary to dump trimmed mushrooms into the trough of the device 35 is to configurate the corresponding portion of the path in such a way that the chain 5 automatically changes the orientation of fungi-carrying receptacles by 180 degrees in that portion of the endless path which is adjacent the trough. However, it is often desirable or advantageous to provide means for ensuring that the orientation of receptacles 1 is changed on their way beyond the trimming device 34 in order to ensure that trimmed mushrooms P are invariably dumped into the trough of the receiving device 35.

That part of the chain conveyor 5 which is located at the charging station 29 is mounted on a carriage 129 which is suspended on cables or ropes 36 and is movable up and down along the front ends of the beds 22-25 by a motor-driven winch 37. Vertical movements of the carriage 129 relative to the frame 21 for the beds 22-25 (i.e., a raising or lowering of the charging station 29 relative to the frame 21) entails changes of the length of two aligned vertical stretches of the chain conveyor 5 at 28 in FIG. 11. The apparatus further comprises two chain deflecting devices 30, 31 which are mounted on a vertically movable slide 32. This slide is movable up and down along a vertical guide 38. The winch 37 is actuated to change the level of the charging station 29 for convenience of the person or persons in charge of harvesting grown mushrooms P and of transferring harvested mushrooms into empty receptacles 1 in the upper horizontal row of receptacles on the carriage 129. The arrow A denotes the direction of continuous or stepwise advancement of receptacles 1 along their endless path. If the frame 21 is large and the beds 22-25 are relatively long, the apparatus can comprise a second motor-driven conveyor 5 at the rear ends of the beds. Furthermore, it is clear that the number of beds can be increased or reduced without departing from the spirit of the invention. The winch 37 can be operated by hand, as long as it is capable of moving the carriage 129 to a selected level and of thereupon maintaining the carriage at the selected level for a desired interval of time.

FIGS. 1 to 5 show receptacles 1 which can be utilized in the apparatus of FIG. 11. Each of these receptacles is an elongated rectangular plate-like body which is preferably made (e.g., extruded or molded) from a suitable plastic material and includes a frame 101 surrounding the centrally located funnel-shaped socket 201 having an open upper end 7 and an open lower end 8. The opening 2 extends from the upper side 6a downwardly beyond the underside 6 of the frame 101. Since the frame 101 is hollow, it is preferably reinforced by one or more ribs or webs (note the ribs 9 and 10 in FIG. 2) which extend all the way to the open lower end 8 of the respective socket 201 and substantially transversely of the longitudinal direction of the respective receptacle 1.

The configuration of the opening 2 in the funnel-shaped socket 201 is such that the opening permits passage of the mycelium M and stem S but not the passage of the pileus C of a mushroom P which is sufficiently grown to be removed from the bed 22, 23, 24 or 25. Thus, the pilei C are intercepted by the upper sides 6a of the frames 101 but the mycelia M extend downwardly beyond the lower ends 8 of the respective sockets 201 to be automatically separated from the major portions of the stems S during advancement of the respective receptacles 1 past the trimming device 34 on their way toward the receiving and evacuating device 35.

Certain links of the chain conveyor 5 carry horizontal pin-shaped projections 4 which define pivot axes for receptacles 1 and are snugly received in the apertures 3 of the frames 101 in the receptacles. The frictional engagement between the projections 4 and the surfaces surrounding the respective apertures 3 suffices to ensure that the orientation of the receptacles 1 relative to the chain conveyor 5 remains unchanged unless the receptacles are caused to turn about the axes of the corresponding projections 4. These projections are preferably equidistant from each other and the receptacles 1 are preferably mounted in such a way that their longer sides are parallel to the respective projections (see FIGS. 5 to 11) and that each projection 4 is located midway between the longer sides of the respective receptacle. The apparatus must be provided with one or more means for changing the orientation of receptacles 1 relative to the chain conveyor 5 when such changes of orientation are necessary, e.g., in the region of the deflecting device 30 where the receptacles 1 (at least some of which carry mushrooms P toward the trimming device 34) are caused to advance from a horizontal into a vertical section of the endless path which is defined by the chain conveyor 5. Analogously, the orientation of the receptacles 1 relative to the conveyor 5 must be changed (i.e., the receptacles must remain in substantially horizontal planes) at least slightly ahead of the trimming device 34 where the receptacles are caused to advance from a vertical section into a horizontal or nearly horizontal section of their endless path. As already explained above, the orientation of receptacles 1 relative to the conveyor 5 need not be changed in the region of the removing device 35 provided that the configuration of the respective portion of the path is such that each receptacle is compelled to dump the trimmed mushroom into the trough of the device 35. FIG. 11 shows that the orientation of receptacles 1 relative to the conveyor 5 need not be changed at the lower end of the guide 38 and/or at the deflecting device 31 and/or at the right-hand end of the carriage 129.

The reinforcing ribs or webs 9, 10 at the undersides 6 of the frames 101 can serve an additional useful purpose, namely that of guiding the receptacles 1 and/or the knife 11 of the means for severing the mushrooms P to an optimum position for trimming of the stems S at desired locations, namely at or very close to the lower ends 8 of the funnel-shaped sockets 201. To this end, the knife 11 can be mounted for movements in directions indicated by a double-headed arrow 111 (FIG. 6) and can be biased upwardly by a suitable spring so that it slides along the ribs 9, 10 toward an optimum position for severing of successive stems S at or very close to the lower ends 8 of the respective sockets 201. The size of the pileus C and the diameter of the open upper end 7 of a socket 201 determine the exact location of the cut which is made by the cutting edge of the knife 11 because these parameters determine the extent of penetration of the stem S downwardly and beyond the open lower end 8 of the socket 201.

An advantage of funnel-shaped sockets 201 for the mushrooms P is that the receptacles 1 automatically permit smaller mushrooms to descend deeper into the sockets so that the lower ends of their stems S project beyond the open lower ends 8 of the sockets to be properly trimmed by the knife 11 or by any other suitable severing tool. In other words, the receptacles 1 can automatically classify mushrooms according to size to thus ensure that the mushrooms are adequately trimmed even if their size departs from a standard or optimum size. The pilei C of larger mushrooms with longer stems and larger pilei are intercepted by the upper sides 6a of the respective frames 101 but the pilei of smaller mushrooms with shorter stems are free to partially enter the upper ends 7 of the respective sockets 201 to thus ensure that the lower ends of the stems are in optimum positions for treatment during advancement past the trimming device 34.

The conveyor 5 can be designed to continuously advance the receptacles 1 along their endless path so that empty receptacles are available at the charging station 29 at all times.

Proper guidance of receptacles 1 is particularly important during advancement of such receptacles past the trimming device 34. This ensures that the axes of the openings 2 are substantially vertical on their way toward and past the trimming device 34 and that the pilei C of mushrooms P in loaded receptacles 1 are free to enter the upper ends of the respective sockets 201 if they are sufficiently small. This, in turn, ensures that the knife 11 can properly trim the stems S of larger or smaller mushrooms. As a rule, the receptacles 1 will tend to change their orientation on impact against the knife 11 and, therefore, it is desirable to ensure that the frictional engagement between the projections 4 and the surfaces bounding the respective apertures 3 is sufficiently pronounced to prevent any but intentional changes of orientation of the receptacles. Alternatively, and as will be described with reference to FIG. 10, the apparatus can be provided with means for positively preventing any undesirable changes of orientation of receptacles, at least during advancement past the knife 11 of the trimming device 34.

Each receptacle can be provided with two or even more openings for the stems of mushrooms.

Figure 7:
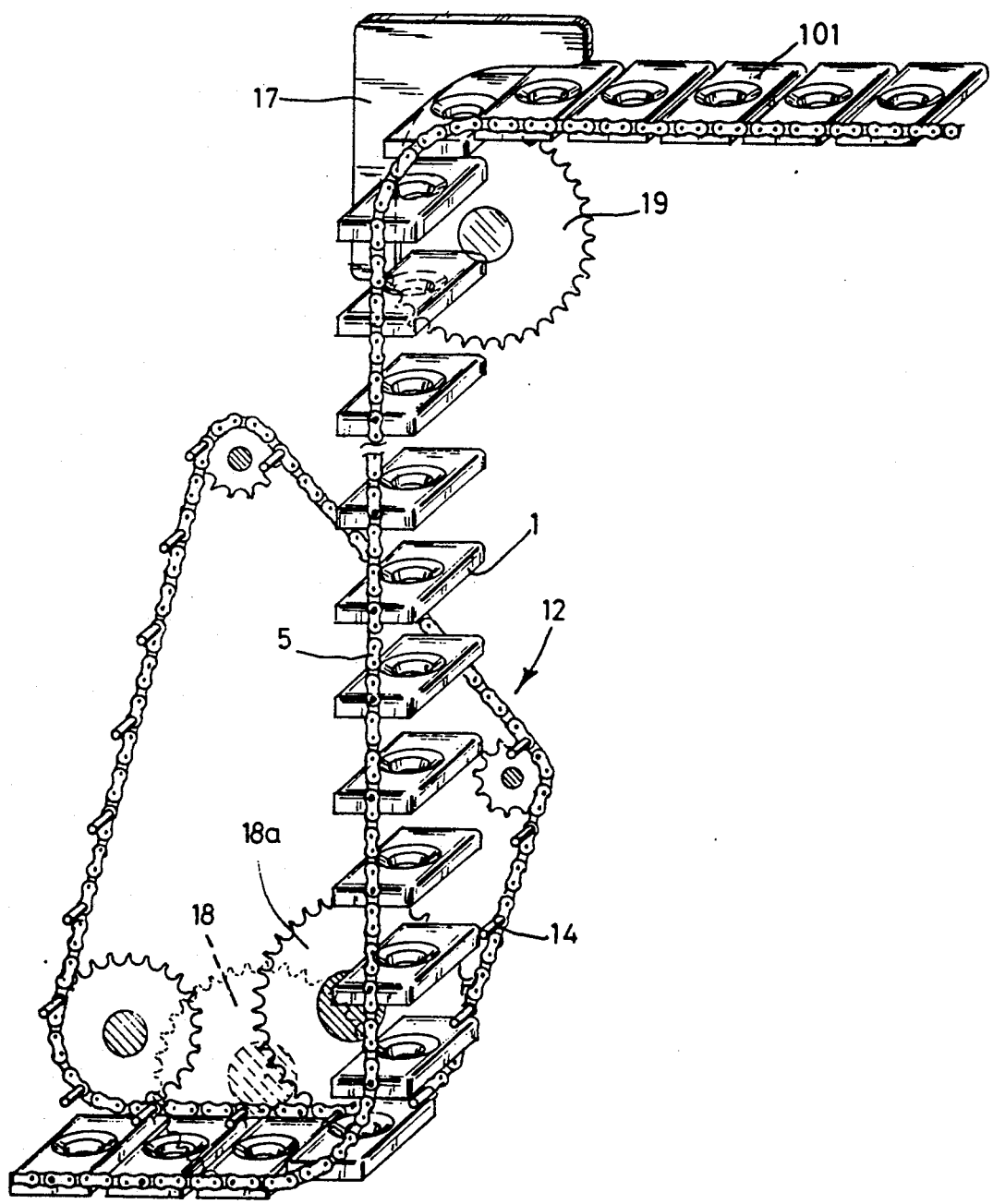
FIG. 7 is a fragmentary perspective view of the conveyor for receptacles and further shows two different devices which prevent changes of orientation of receptacles during advancement between successive differently inclined sections of the path which is defined for advancement of receptacles past a charging, a trimming and an evacuating station.

The lower portion of FIG. 7 shows one form of means for preventing changes of orientation of receptacles 1 relative to the chain conveyor 5, e.g., in the region of the deflecting device 30. The preventing means comprises a driven endless chain conveyor 12 which is disposed in a vertical plane adjacent the plane of the conveyor 5 so that the receptacles 1 advancing from the horizontal into the vertical section of their endless path are located between the conveyors 5 and 12. The conveyor 12 carries protuberances 14 which engage the adjacent receptacles 1 in the region of advancement of receptacles from the horizontal into the vertical section of their path and maintain the thus engaged receptacles in horizontal or nearly horizontal planes. The deflecting device 30 comprises a sprocket wheel 18 which is driven by the motor 41 and advances the chain conveyor 5. The endless chain conveyor 12 is trained over a set of sprocket wheels including a sprocket wheel 18a. The latter can receive torque from the mtor 41 or from a discrete prime mover and advances the chain 12 at a speed which is properly related to the speed of the conveyor 5 in order to ensure that the protuberances 14 can maintain the adjacent receptacles 1 in horizontal planes (see also FIG. 8) during advancement past the deflecting device 30. Those protuberances 14 which engage the adjacent receptacles 1 are parallel with and are laterally offset relative to the respective projections 4 (see particularly FIG. 8).

The upper portion of FIG. 7 shows that portion of the chain conveyor 5 where the receptacles 1 (at least some of which carry freshly harvested mushrooms, not shown) must advance from a vertical into a horizontal section of their path on their way toward the trimming device 34. The orientation of the receptacles 1 relative to the chain conveyor 5 is changed (i.e., the receptacles are compelled to remain in horizontal planes) by a modified preventing means including a stationary cam or guide 17 which is adjacent the path of movement of receptacles and has a concave cam face which is directly engaged by the adjacent portions of frames 101 to prevent any changes of orientation of the receptacles. That portion of the chain conveyor 5 which advances past the cam 17 is trained over a sprocket wheel 19.

Figure 9:
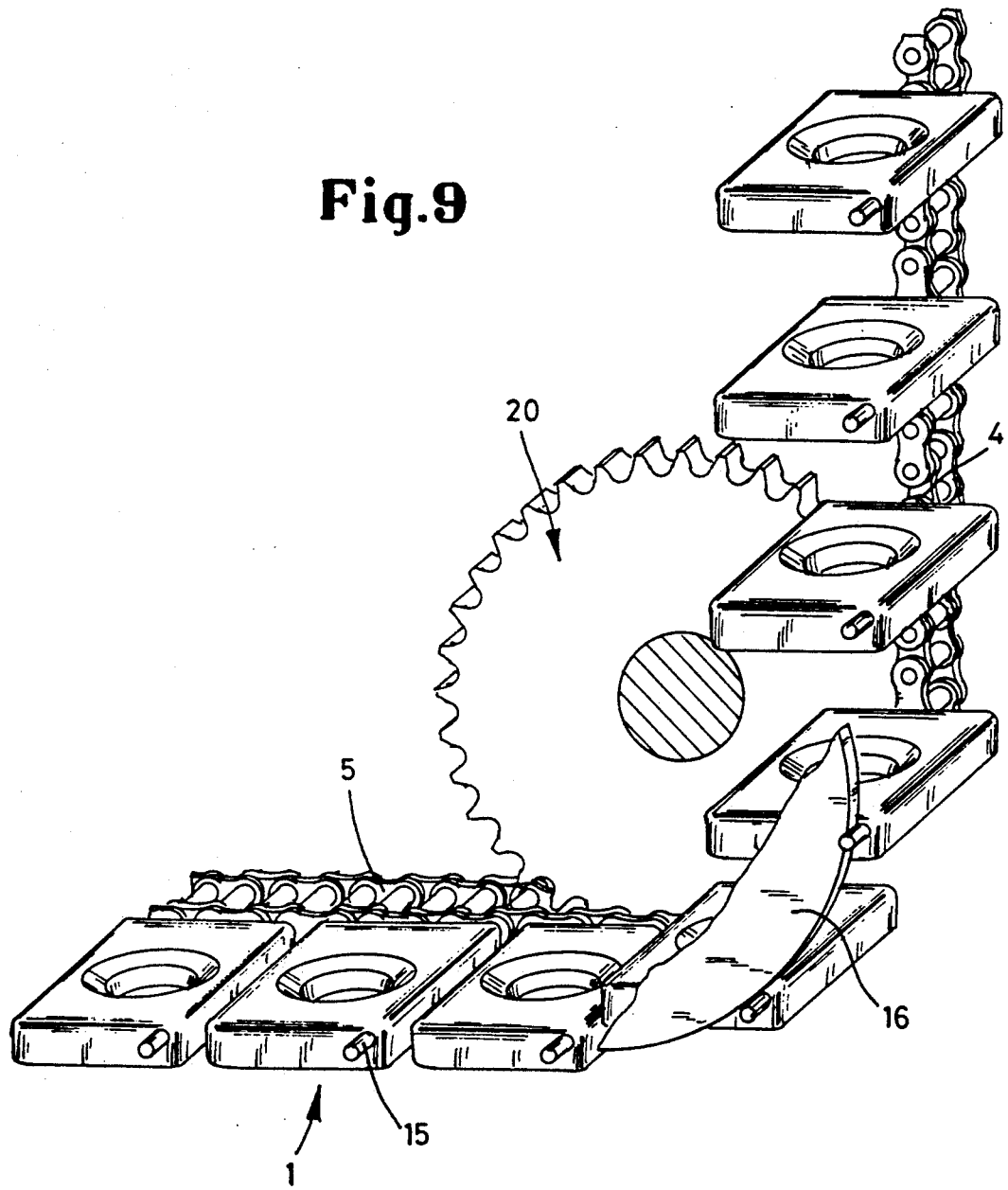
FIG. 9 is a fragmentary perspective view of the conveyor for receptacles and of a modified device which prevents changes of orientation of receptacles during advancement between successive differently inclined sections of the path.

FIG. 9 shows additional means for preventing changes of orientation of receptacles 1; such preventing means can be used in lieu of the preventing means shown in the lower portion or in the upper portion of FIG. 7. A stationary cam 16 adjacent a sprocket wheel 20 for the chain conveyor 5 is tracked by pin-shaped followers 15 which are provided on the receptacles 1 and are laterally offset with reference to the corresponding projections 4 of the conveyor 5. The configuration of the peripheral surface of the stationary cam 16 is such that a follower 15 which slides therealong is compelled to maintain the corresponding receptacle 1 in a substantially horizontal plane. The cam 16 can be made of metallic sheet material.

FIG. 10 shows a modified (substantially L-shaped) receptacle 1' which can be used in lieu of receptacles 1. The vertical arm 39 of the receptacle 1' is mounted on the respective projection 4 of the chain conveyor 5 in such a way that it is free to pivot back and forth about a substantially horizontal axis. In order to ensure that the plate-like (mushroom-carrying) portion 1a' of the receptacle 1' will remain in a horizontal plane, at least during certain stages of movement of such receptacle along its endless path (e.g., during advancement past the knife 11), the apparatus which employs receptacles 1' further comprises means for pivoting the receptacles relative to the chain conveyor 5. The illustrated pivoting means comprises a stationary rail 40 which defines a track for parts of successive plate-like portions 1a'. The illustrated rail 40 has a substantially U-shaped cross-sectional outline.

The arm 39 and the portion 1a' can be made of one piece from a metallic or plastic material. Alternatively, prefabricated receptacles 1 of the type shown in FIGS. 1 to 4 can be connected to separately produced arms 39.

The arm 39 can be mounted on the respective projection 4 with sufficient freedom of angular movement to ensure that the portion 1a' automatically assumes the illustrated position in a substantially horizontal plane. However, it is presently preferred to utilize the rail 40 in order to ensure that the portion 1a' will remain in a horizontal plane, at least during trimming of mushrooms by the cutting edge of the knife 11. The guide 40 ensures that the lower end of the opening 2 in the portion 1a' will be maintained in an optimum position with reference to the plane of the knife 11.

Commonly owned U.S. Pat. No. 4,846,337 (granted July 11, 1989) discloses an arrangement for manipulating eggs. The patented arrangement employs an endless chain conveyor with L-shaped receptacles which serve to receive and transport eggs and are mounted on projections of the chain conveyor for pendulum movement about substantially horizontal axes.

Figure 8:
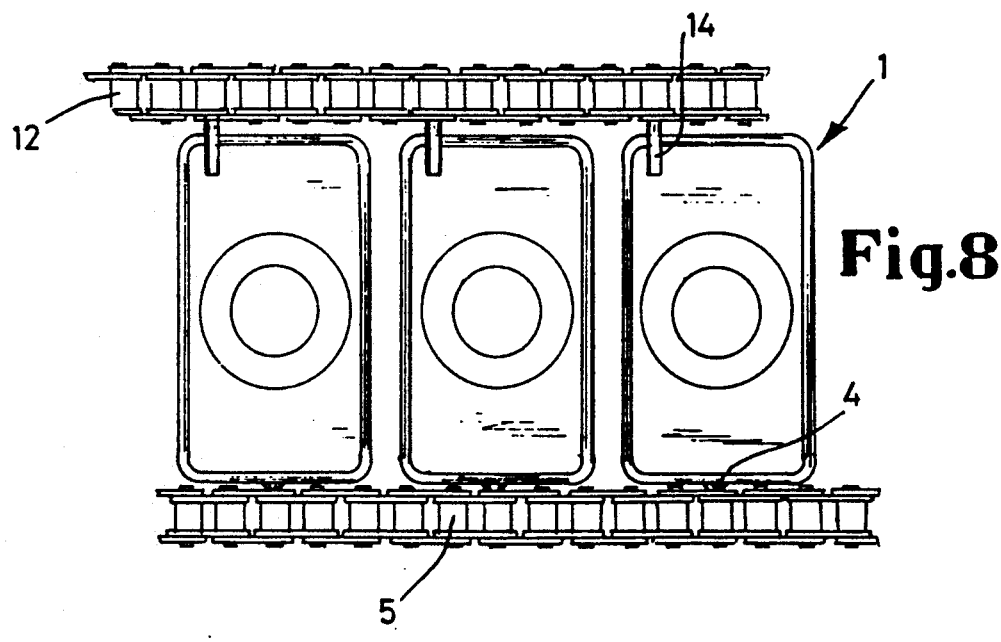
FIG. 8 is an enlarged plan view of a detail in FIG. 7.

An advantage of receptacles 1' of the type shown in FIG. 10 is that the apparatus need not be provided with preventing means of the type shown in FIGS. 7, 8 and 9 because each portion 1a' of a freely pivotable receptacle 1' will invariably tend to assume an optimum position in a substantially horizontal plane. The rail 40 constitutes safety or precautional feature which even more reliably ensures that the orientation of freely pivotable receptacles 1' does not change during advancement past the knife 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting and trimming fungi wherein a stem carries a pileus at one end and a mycelium at the other end, comprising a conveyor defining an elongated path having a series of differently inclined sections; a plurality of receptacles carried by said conveyor and having openings arranged to receive the stems of discrete fungi while affording access to the stems in the regions of the respective mycelia, said conveyor having means for supporting said receptacles for angular movement about substantially horizontal axes and each of said receptacles being in frictional engagement with the conveyor so that it resists angular movements about the respective axis; means for driving said conveyor so as to advance said receptacles along said path in a predetermined direction; means for preventing changes of orientation of said receptacles during advancement between successive sections of said path; means defining a charging station which is adjacent a first portion of said path and where said receptacles accept fungi for advancement along said path; and a trimming device adjacent a second portion of said path downstream of said first portion and having means for severing the stems of fungi in the regions of the respective mycelia while the receptacles containing fungi advance along the second portion of said path.

2. The apparatus of claim 1, wherein each of said receptacles has an upper side and an underside and said openings extend between the upper sides and the undersides of the respective receptacles, said openings being dimensioned to permit the passage of mycelia and stems but to prevent the passage of pilei so that the pilei of fungi which are introduced into the receptacles at said station are intercepted by the upper sides of the receptacles, said severing means being adjacent the undersides of receptacles advancing along the second portion of said path.

3. The apparatus of claim 2, wherein said path is an endless path and further comprising means for receiving trimmed fungi at a third portion of said path downstream of said second portion and upstream of said first portion.

4. The apparatus of claim 2, wherein said conveyor comprises an endless chain having means for supporting said receptacles for movement about the respective substantially horizontal pivot axes.

5. The apparatus of claim 2, wherein said openings are substantially funnel-shaped.

6. The apparatus of claim 1, wherein each of said receptacles has at least one opening and includes a frame having an upper side and an underside and a socket surrounded by said frame and defining the at least one opening, said socket having an open upper end at said upper side and an open lower end at a level below said underside, the mycelium of a fungus in a receptacle advancing beyond the first portion of said path being located beneath the lower end and the pileus of such fungus being disposed at the upper end of the respective socket, said severing means being located at the level of the lower ends of sockets advancing along the second portion of said path.

7. The apparatus of claim 1, wherein each of said receptacles has at least one opening having an upper end and a lower end, each receptacle including a frame and a socket surrounded by the frame and defining the at least one opening, said frame having an upper side at the upper end, an underside and at least one reinforcing rib disposed at said underside and extending to the lower end of the respective at least one opening.

8. The apparatus of claim 7, wherein said receptacles are elongated and said ribs extend substantially transversely of the longitudinal directions of the respective receptacles.

9. The apparatus of claim 1, wherein each of said receptacles contains a plastic material.

10. The apparatus of claim 9, wherein each of said receptacles is a shaped plastic article.

11. The apparatus of claim 1, wherein said path includes substantially horizontal and substantially vertical sections.

12. The apparatus of claim 1, wherein said supporting means includes projections provided on said conveyor, one for each of said receptacles, and said receptacles have apertures snugly receiving the respective projections.

13. The apparatus of claim 1, wherein said receptacles constitute substantially plate-like bodies and said means for preventing changes of orientation comprises a driven second conveyor having means for maintaining said plate-like bodies in substantially horizontal planes.

14. The apparatus of claim 13, wherein said second conveyor comprises an endless chain and said means for maintaining comprises protuberances provided on said chain to engage said plate-like bodies during advancement between successive sections of said path.

15. The apparatus of claim 1, wherein said means for preventing changes of orientation comprises at least one cam adjacent those receptacles which advance between successive sections of said path and at least one follower provided on each receptacle and arranged to track said cam.

16. The apparatus of claim 15, wherein said followers are spaced apart from the respective axes.

17. The apparatus of claim 1, wherein said means for preventing changes of orientation comprises at least one fixed cam between successive sections of said path, said receptacles including substantially plate-like bodies having portions which track said cam during advancement between said successive sections to maintain the plate-like bodies in substantially horizontal planes.

18. The apparatus of claim 1, wherein said means for preventing changes of orientation comprises means for pivoting said receptacles.

19. The apparatus of claim 18, wherein said pivoting means comprises a rail defining a track for portions of receptacles advancing between successive sections of said path.

* * * * *